(12) United States Patent
Akatsu et al.

(10) Patent No.: US 8,262,551 B2
(45) Date of Patent: Sep. 11, 2012

(54) CENTRIFUGE HAVING DISPLACEMENT SENSOR

(75) Inventors: Katsunori Akatsu, Ibaraki (JP); Yoshitaka Niinai, Ibaraki (JP); Hisanobu Ooyama, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 942 days.

(21) Appl. No.: 12/261,337

(22) Filed: Oct. 30, 2008

(65) Prior Publication Data

US 2009/0170683 A1    Jul. 2, 2009

(30) Foreign Application Priority Data

Oct. 31, 2007 (JP) ................................ P2007-283526

(51) Int. Cl.
*B04B 9/14* (2006.01)
*B04B 13/00* (2006.01)
(52) U.S. Cl. ................... 494/7; 494/10; 494/82
(58) Field of Classification Search .................. 494/1, 7, 494/10, 11, 13, 14, 16, 8–9, 84, 20, 31, 33, 494/82; 210/144, 379
See application file for complete search history.

(56) References Cited

U.S. PATENT DOCUMENTS

| | | | | |
|---|---|---|---|---|
| 3,101,322 A | * | 8/1963 | Stallman et al. | 494/9 |
| 3,422,957 A | * | 1/1969 | Fosler | 210/144 |
| 3,699,287 A | * | 10/1972 | Stahl et al. | 200/61.45 R |
| 4,910,502 A | * | 3/1990 | Serveau et al. | 340/683 |
| 5,160,876 A | * | 11/1992 | Niinai et al. | 318/460 |
| 5,738,622 A | * | 4/1998 | Niinai et al. | 494/7 |
| 7,104,944 B2 | * | 9/2006 | Fujimaki et al. | 494/10 |
| 7,255,669 B2 | * | 8/2007 | Shimizu et al. | 494/9 |
| 7,883,456 B2 | * | 2/2011 | Kusumoto et al. | 494/10 |
| 8,038,592 B2 | * | 10/2011 | Toi et al. | 494/2 |
| 2005/0079064 A1 | * | 4/2005 | Shimizu et al. | 417/42 |
| 2005/0153823 A1 | * | 7/2005 | Fujimaki et al. | 494/7 |
| 2009/0170683 A1 | * | 7/2009 | Akatsu et al. | 494/9 |

FOREIGN PATENT DOCUMENTS

| | | |
|---|---|---|
| JP | 55-109461 | 8/1980 |
| JP | 2-074840 | 3/1990 |
| JP | 2006-007093 | 1/2006 |
| JP | 2006007093 A * | 1/2006 |

OTHER PUBLICATIONS

Japanese Office Action, w/ English translation thereof, issued in Japanese Patent Application No. 2007-283526, dated Oct. 11, 2011.

* cited by examiner

*Primary Examiner* — Charles E Cooley
(74) *Attorney, Agent, or Firm* — McDermott Will & Emery LLP

(57) ABSTRACT

According to an aspect of the invention, a centrifuge includes: a rotor for separating samples; a motor for driving and rotating the rotor; a drive shaft for connecting together the motor and the rotor; a rotation sensor for detecting at least one of the rotation speed of the motor and the rotor; and a displacement sensor for detecting the swinging motion of the rotor or the drive shaft, wherein, after one of speed of the motor and the rotor is accelerated up to previously set rotation speed, when the swinging amount of the rotor or the drive shaft is equal to or more than preset allowable value, the supply of power to the motor is stopped to decelerate the motor, wherein, during the deceleration, signal from the displacement sensor is compared with the preset allowable value, and wherein when the signal from the displacement sensor becomes equal to or less than the preset allowable value, the motor is accelerated.

5 Claims, 4 Drawing Sheets

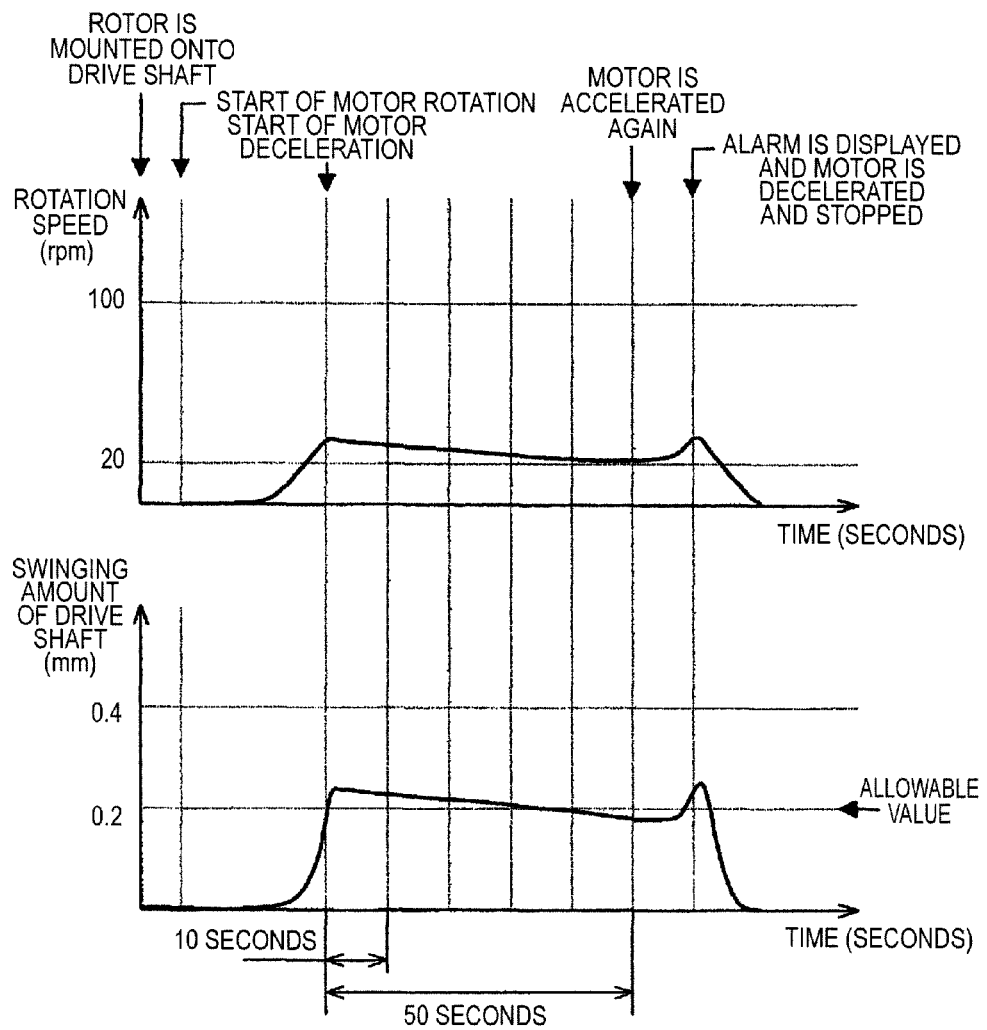

CENTRIFUGE HAVING DISPLACEMENT SENSOR

CROSS-REFERENCE TO RELATED APPLICATIONS

This application is based upon and claims the benefit of priority from Japanese Patent Application No. 2007-283526, filed Oct. 31, 2007, the entire contents of which are incorporated herein by reference.

BACKGROUND

1. Field

The present invention relates to an imbalance detect method for use in a centrifuge which centrifuges samples stored in a rotor.

2. Description of the Related Art

As a centrifuge mainly for use in research and development for manufacture of drugs and reagents, generally, there is often used a centrifuge in which the rotation speed of a rotor is 20,000 rpm or more. In this type of centrifuge, a rotor, into which samples are to be stored and which is then rotated to separate the samples therein, is rotated at a high speed.

Samples to be centrifuged are respectively stored into tubes each having a small capacity of the order of 10 ml to 40 ml, the tubes are made to balance in such a manner that the samples thereof are equal to each other in capacity and mass, and the tubes are then stored into their associated and opposed tube holes respectively formed in the rotor. However, since it cannot be expected that the tubes are made to balance strictly, the motor and rotor are connected through a resilient drive shaft in such a manner that the rotation eccentricity of the rotor caused by the imbalanced samples can be absorbed by the flexing of the drive shaft, whereby the rotor can be rotated at a high speed.

When the imbalance of the samples becomes large, the rotation eccentricity of the rotor cannot be absorbed by the flexing of the drive shaft, so that the drive shaft can be bent or damaged. In order to prevent such problem, there is mounted an imbalance detector such as a displacement sensor for detecting the flexing of the rotation shaft in a non-contact manner, and the swinging amount of the drive shaft is detected by such imbalance detector; and, when the swinging amount of the drive shaft becomes equal to or more than an allowable value, the rotation of the motor is caused to stop. Although the allowable value of the swinging amount of the drive shaft differs according to the diameter dimension of the drive shaft, generally, it is in the range of about 0.4 mm to 0.6 mm. When the imbalance amount of the samples is small, there is a tendency that, as the number of rotations of the motor increases, the swinging amount of the drive shaft increases gradually. In view of this, while changing the time for detecting the sample imbalance according to the allowable value of the drive shaft, the sample imbalance is detected.

Recently, owing to the enhanced strength of the rotor and the enhanced analysis precision of the rotor strength, it has been possible that a bottle of 100 ml to 250 ml can be stored into the rotor. This makes it possible to use, as equipment for producing drugs and reagents, a centrifuge which rotates at a high speed.

In the case of the production equipment, since there are many routine works and simple flow processes to be carried out, sometimes, an operator can omit to store only one bottle into the rotor. In this case, for several dozens to several hundreds of rotations of the rotor, the drive shaft is caused to swing suddenly and greatly. Therefore, even if the rotor is caused to stop when the swinging amount of the drive shaft is in the order of 0.4 mm to 0.6 mm, there is a fear that the drive shaft can be bent. In order to prevent such problem, for hundreds of rotations or less of the rotor, the allowable swinging amount of the drive shaft is lowered down to about 0.2 mm, whereby the sample imbalance due to the omission of storage of the bottle can be detected to thereby prevent the drive shaft from being bent.

However, since the rotor capable of storing bottles each of 100 ml to 250 ml therein is large and heavy, when the rotor is mounted onto the drive shaft, there is a possibility that an operator can oscillate the rotor in error to thereby cause the drive shaft to swing by an amount of about 0.2 mm to 0.4 mm. When the centrifuge is operated in this state, there is a fear that, since the allowable swinging amount of the drive shaft is 0.2 mm for hundreds of rotations of the rotor, the state of the samples can be misunderstood to be imbalanced and thus the centrifuge can be caused to stop. Therefore, an operator must wait for the time (about 60 seconds) until the swinging motion of the drive shaft when mounting the rotor settles down, before the operator starts to operate the centrifuge, thereby lowering the operation efficiency of the centrifuge.

Refer to JP-A-2-74840 and JP-A-2006-7093.

When using a centrifuge as production equipment, preferably, the centrifuge can be rotated just after a rotor is mounted thereon. Thus, it has been desired that, even if a drive shaft is caused to swing when the rotor is mounted onto the drive shaft, the centrifuge can be rotated, and also that the excessive imbalance of samples, which is caused when an operator omits to store one bottle or more into the rotor, can be detected safely.

Thus, it is an object of the invention to provide a centrifuge which can positively detect the excessive imbalance caused by the omission of storage of the bottle and also can be operated just after a rotor is mounted onto a drive shaft, thereby being able to enhance the operation efficiency thereof.

SUMMARY OF THE INVENTION

In attaining the above object, according to the invention there is provided a centrifuge, including: a rotor for separating samples; a motor for driving and rotating the rotor; a drive shaft for connecting together the motor and rotor; a rotation sensor for detecting the rotation speed of the motor or rotor; and, a displacement sensor for detecting the swinging motion of the rotor or drive shaft, wherein, after the motor or rotor is accelerated up to a previously set rotation speed, when the swinging amount of the rotor or drive shaft is equal to or more than a preset allowable value, the supply of power to the motor is stopped to decelerate the motor, during such deceleration, a signal from the displacement sensor is compared with the preset allowable value and, when the signal from the displacement sensor becomes equal to or less than the preset allowable value, the motor is accelerated.

According to the invention, if the drive shaft is caused to swing when the rotor is mounted onto the drive shaft, after the motor is accelerated once, the supply of power to the motor is stopped to thereby allow the motor to decelerate naturally; and, when the swinging amount of the drive shaft goes down to the allowable value or less, the motor is accelerated again. This makes it possible to provide a centrifuge which is enhanced not only in the reliability of the imbalance detection but also in the efficiency of the centrifugal operation thereof.

BRIEF DESCRIPTION OF THE SEVERAL VIEWS OF THE DRAWINGS

FIG. 4 is a graphical representation of the swinging motion of the drive shaft and the rotation speed of the motor or rotor when the centrifuge according to the invention is operated with excessive imbalance.

DETAILED DESCRIPTION

Now, description will be given below of an embodiment of a centrifuge according to the invention with reference to the accompanying drawings.

Figure 1:
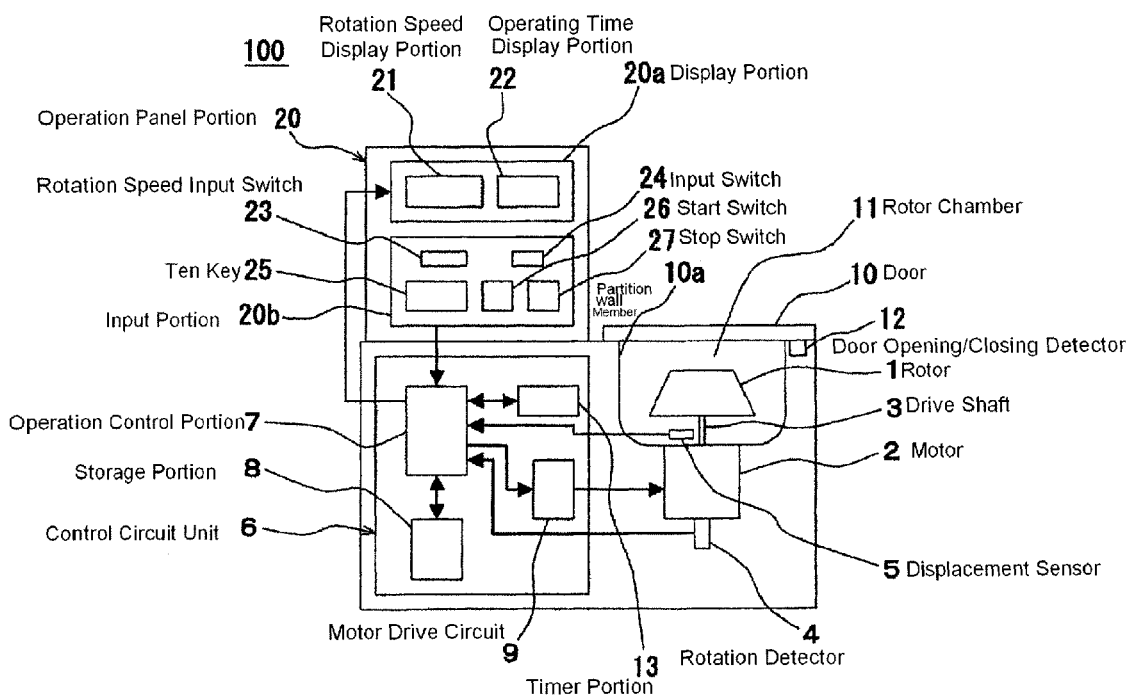
FIG. 1 is a block diagram of a centrifuge according to an embodiment of the invention.
Figure 2:
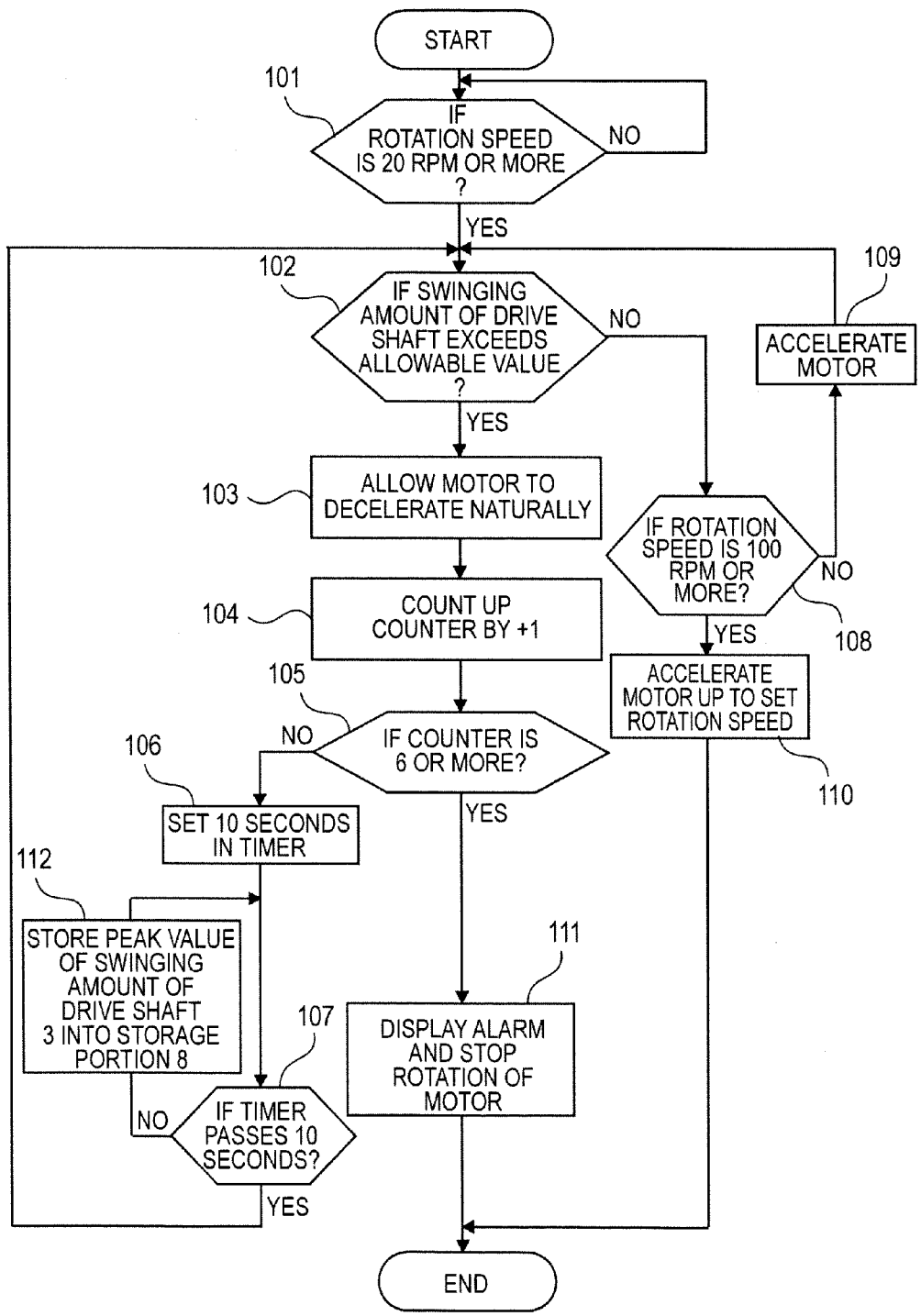
FIG. 2 is a flow chart used to carry out an imbalance detecting operation in the low speed area of the centrifuge shown in FIG. 1.
Figure 3:
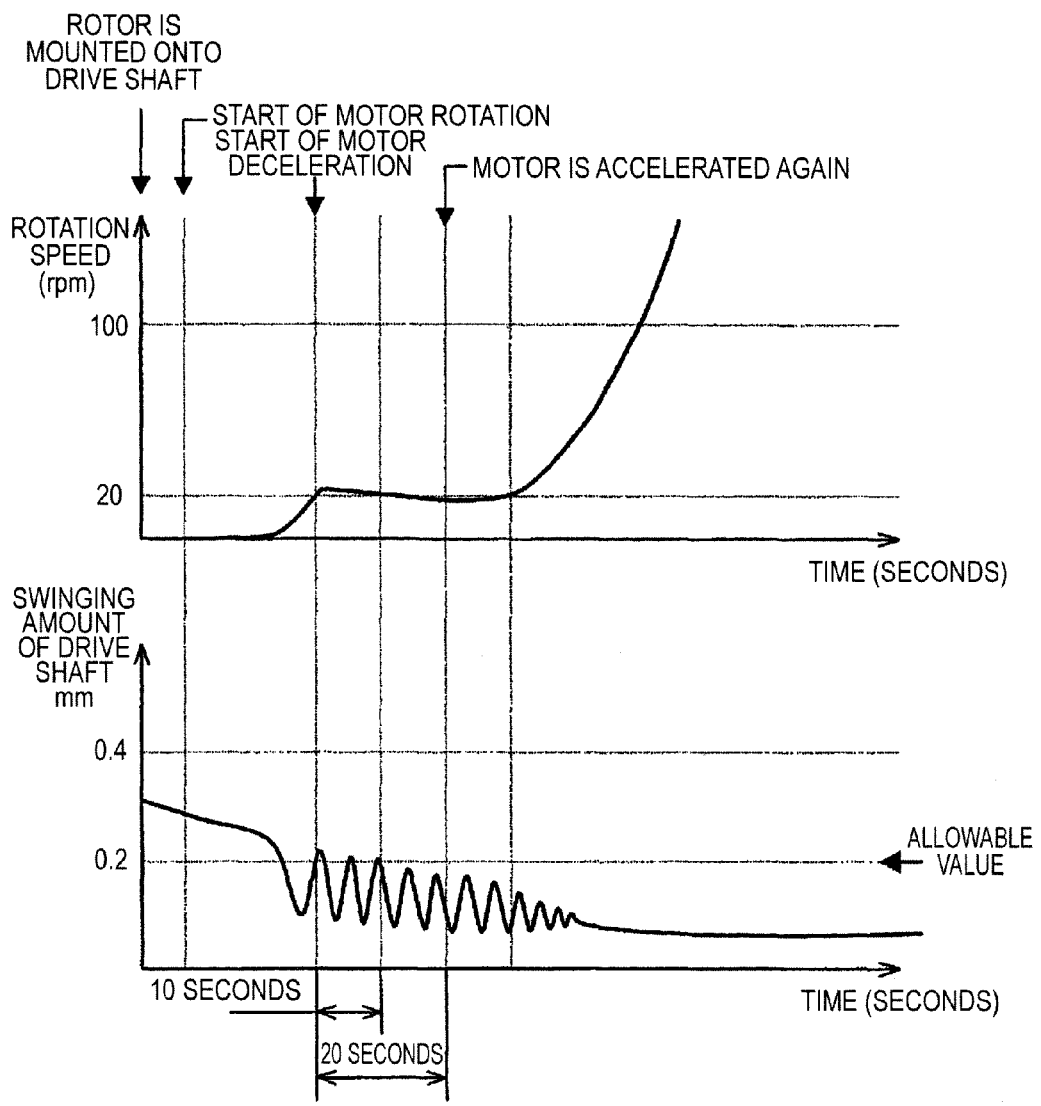
FIG. 3 is a graphical representation of the swinging motion of a drive shaft and the rotation speed of a motor or a rotor when the centrifuge according to the invention is operated in a state where the drive shaft is swinging.

FIG. 1 is a function block diagram of a centrifuge according to an embodiment of the invention, FIG. 2 is a flow chart used to carry out an imbalance detecting operation in the low speed area of the centrifuge shown in FIG. 1, FIG. 3 shows the swinging amount of a drive shaft and the rotation speed of a motor or a rotor when the operation of the rotor with no sample imbalance is started in a state where the drive shaft is not swinging, and FIG. 4 shows the swinging amount of the drive shaft and the rotation speed of the motor or rotor when the operation of the rotor with excessive sample imbalance is started in a state where the drive shaft is not swinging.

As shown in FIG. 1, the present centrifuge 100 includes the drive shaft 3 of a motor 2 disposed in a rotor chamber 11 defined by a partition wall member 10a including a bowl made of metal or the like and a door 10; a rotor 1 for storing therein samples to be centrifuged is removably mounted on the drive shaft 3 of the motor 2; and, the rotor 1 is structured such that it can be driven and rotated by the motor 2.

The number of rotations of the rotor 1 or motor 2 is detected as a rotation number signal by a rotation detector 4 including a magnetic sensor made of Hall elements or the like, and the swinging amount of the drive shaft 3 is detected by a displacement sensor 5.

A control circuit unit 6 includes an operation control portion 7 made of a CPU, a storage portion 8 having a ROM, a RAM and the like for storing therein a control program and data, a timer portion 13 having a timer (which will be discussed later), and a motor drive circuit 9, which are respectively used as circuit functions. Further, in the storage portion 8, there are previously stored the allowable values of the swinging amounts of a drive shaft which will be discussed later.

An operation panel portion 20 is connected to the control circuit unit 6. The operation panel portion 20 includes a display portion 20a and an input portion (an operation switch) 20b.

The display portion 20a includes a rotation speed display portion 21 for displaying the rotation speed of the rotor 1 and motor 2, an operating time display portion 22 for displaying the operating time of the rotor 1 and motor 2, and the like.

The input portion 20b includes a rotation speed input switch 23 for instructing the input of the rotation speed of the rotor 1 or motor 2, an operating time input switch 24 for instructing the input of the operating time of the rotor 1 or motor 2, and a ten key 25 for instructing the desired input data (numerical values) of the rotation speed or operating time of these composing elements. To input the rotation speed of the rotor 1 or motor 2, firstly, the rotation speed input switch 23 may be depressed and next the desired rotation speed may be input using the ten key 25. The thus set rotation speed is displayed in the rotation speed display portion of the display portion 20a. Similarly, to input the operating time of the rotor 1 or motor 2, the operating time input switch 24 may be depressed and next the desired operating time may be input and set using the ten key 25. Then, the thus set operating time is displayed in the operating time display portion 22 of the display portion 20a.

Further, the input portion 20b includes a start switch 26 which is used to instruct the control circuit unit 6 such that the operation of the motor 2 or rotor 1 is started according to the set rotation speed. On the other hand, there is provided a stop switch 27 which is used to instruct the stop of the rotation of the motor 2.

FIG. 2 is a flow chart which is used to carry out a low speed area imbalance detecting operation according to the present embodiment. Here, in the present embodiment, the term "low speed area" means an area up to 100 rpm.

Now, while referring to FIGS. 2 and 3, description will be given below of the operation of the centrifuge 100 to be carried out when a large-scale rotor (while samples are well balanced) is mounted onto the drive shaft 3, and the rotor is oscillated in error to thereby cause the drive shaft 3 to swing.

The rotation speed and operating time, which are the conditions of the centrifuge, are respectively input in the above-mentioned manner using the input portion 20b, and the rotor 1 for storing therein samples to be centrifuged is mounted onto the drive shaft 3. In this mounting operation, there is a possibility that the rotor 1 can be oscillated in error to thereby cause the drive shaft 3 to swing.

When the start switch 26 is depressed, firstly, a door opening/closing detector 12 detects the opening/closing state of the door 10 which is used to define the rotor chamber 11. When the door 10 is found closed, the control circuit unit 4 starts the rotation of the motor 2 and the motor 2 is accelerated while the drive shaft 3 is swinging. The operation control portion 7 takes therein the signals of the rotation detector 4 and displacement sensor 5.

In Step 101, the centrifuge 100 waits until the rotation speed of the motor 2 reaches 20 rpm. When the rotation speed of the motor 2 exceeds 20 rpm, in Step 102, the operation control portion 7 compares the allowable value of the swinging amount of the drive shaft 3, which the drive shaft 3 has previously stored into the storage portion 8, with the swinging amount of the drive shaft 3 inputted by the displacement sensor 5. As shown in FIG. 3, when the swinging amount of the drive shaft 3 is larger than the allowable value, in Step 103, the supply of the power to the motor 2 is stopped to thereby decelerate the motor 2 (in the present embodiment, the motor 2 is decelerated naturally without applying reverse rotation braking, dc braking or mechanical braking). Next, in Step 104, the operation control portion 7 increases the count of the counter by +1 and stores the increased count into the storage portion 8. The present counter is to count the number of times when the swinging amount of the drive shaft 3 exceeds the allowable value. In Step 105, the operation control portion 7 checks whether the value of the counter is equal to or more than 6 or not. When it is less than 6, the processing goes to Step 106. Or, when it is 6 or more, the operation control portion 7 determines that the drive shaft 3 is caused to swing due to the sample imbalance; and thus, in Step 111, there is displayed an imbalance alarm and the motor 2 is decelerated and stopped. In the present embodiment, the upper limit value of the counter is set for 6. However, the upper limit value may not be always necessary to be 6, but there can be used any arbitrary numeric value, provided that it is capable of checking the imbalance detection accurately.

In Step 106, 10 seconds are set in the timer of the timer portion 13; and, in Step 107, the processing waits until the timer passes 10 seconds and also waits for the time when, as the rotation speed reduces, the swinging amount of the drive shaft 3 decreases.

Although the timer is set for 10 seconds here, it is not always necessary to be 10 seconds. However, according to the results of tests, the time may preferably be twice or more than the time while the motor 2 is rotated once at the rotation speed in Step 101. (For example, when the rotor 1 is rotating at the rotation speed of 20 rpm, the time necessary for the rotor 1 to rotate once is 3 seconds and thus twice 3 seconds is 6 seconds; and, therefore, in the present embodiment, 10 seconds are set in the timer).

In Step 101, there is employed a method for detecting the swinging amount of the drive shaft 3 at a given interval with the time as the reference. Alternatively, however, there may also be employed another method which uses the given lowering speed (for example, 5 rpm) of the rotation speed of the motor or rotor. Further, there may also be employed the number of rotations (for example, every five rotations).

While 10 seconds pass in Step 107, in Step 112, the peak value of the swinging amount of the drive shaft 3 to be input from the displacement sensor 5 is stored into the storage portion 8. After the passage of the 10 seconds, the processing goes back to Step 102, where the peak value of the swinging amount stored in Step 112 is compared with the allowable value of the swinging amount of the drive shaft 3. As described above, when the swinging motion of the drive shaft 3 has not settled down, there are carried out again the processings in Step 103 to Step 107 and, after then, the processing goes back to Step 102. When the drive shaft 3 is caused to swing when the rotor 1 is mounted onto the drive shaft 3, normally, the processings in Step 102 to Step 107 may be carried out twice or three times, whereby the swinging motion of the drive shaft 3 is allowed to settle down. Thus, the processing goes to Step 108, where the rotation speed of the motor 2 is 100 rpm or less. In Step 109, the rotation speed of the motor 2 is accelerated, and the processing goes to Step 102 and Step 108. At the time when the rotation speed exceeds 100 rpm, the processing goes to Step 110, where the motor 2 is allowed to reach the set rotation speed.

According to the present embodiment, the turning points of the rotation speed are set for 20 rpm and 100 rpm. The reason for this is that, when the centrifuge according to the embodiment is operated with such excessive imbalance that one or several bottles are omitted to be stored into the rotor, the drive shaft 3 is caused to swing suddenly and greatly in the range of 30 rpm to 80 rpm. That is, the turning points of the rotation speed may be determined according to the diameter dimension of the drive shaft and the like.

Next, description will be given below of the operation of the centrifuge according to the present embodiment when one bottle is omitted to be stored into the rotor 1, with reference to FIGS. 2 and 4.

As shown in FIG. 4, the rotor 1 is mounted onto the drive shaft 3 without swinging the drive shaft 3, and the start switch 26 is depressed. The door opening/closing detector 12 detects the opening/closing state of the door 10. When the door 10 is found closed, the control circuit unit 4 allows the start of the rotation of the motor 2, while the operation control portion 7 takes therein the signals of the rotation detector 4 and displacement sensor 5.

In Step 101, the processing waits until the rotation speed of the motor 2 reaches 20 rpm. When the rotation speed of the motor 2 exceeds 20 rpm, in Step 102, the allowable value stored in the storage portion 8 by the drive shaft 3 is compared with the swinging amount of the drive shaft 3 input by the displacement sensor 5. As shown in FIG. 4, since the swinging amount of the drive shaft 3 is equal to or less than the allowable value in the vicinity of 20 rpm, the processing advances to Step 108 and Step 109. Then, the processing returns again to Step 102. In the vicinity of the time when the rotation speed exceeds 30 rpm, the swinging motion of the drive shaft 3 suddenly increases and thus the swinging amount of the drive shaft 3 exceeds the allowable value. Therefore, in Step 103, the supply of power to the motor 2 is stopped. Next, in Step 104, the counter is counted up by +1 and, in Step 105, the counter is checked whether the value thereof is 6 or more or not. When the counter value is found less than 6, the processing moves to Step 106.

In Step 106, 10 seconds are set in the timer of the timer portion 13 and, in Step 107, the processing waits until the timer passes 10 seconds and also waits until, as the rotation speed reduces, the swinging motion of the drive shaft 3 reduces.

While 10 seconds pass in Step 107, the peak value of the drive shaft 3 to be taken from the displacement sensor 5 in Step 112 is stored into the storage portion 8. After the passage of the 10 seconds, the processing goes back to Step 102, where the peak value of the swinging amount of the drive shaft 3 stored in Step 112 is compared with the allowable value of the swinging amount of the drive shaft 3 previously stored in the storage portion 8. As described above, when an operator omits to store one bottle, since the drive shaft 3 swings suddenly and greatly, the swinging amount of the drive shaft 3 is equal to or more than the allowable value; and, therefore, the processings in Steps 103 to 107 are carried out again and, after then, the processing goes back to Step 102. Normally, the processings in Steps 102 to 107 may be carried out five times or so, whereby the swinging motion of the drive shaft 3 is allowed to settle down; and thus, the processing advances to Step 108. The value of the counter at the then time provides 5. Since the rotation speed is less than 100 rpm, the motor 2 is accelerated again in Step 109, and the processing advances to Step 102. When the motor 2 is accelerated again, as shown in FIG. 4, similarly, the swinging motion of the drive shaft 3 is suddenly increased again in the vicinity of about 30 rpm; and thus, in Step 103, the supply of power to the motor 2 is stopped and, in Step 104, the counter is counted up by +1, whereby the counter value turns to 6. That is, in Step 105, the counter value is 6. Thus, the processing advances to Step 111, where an imbalance alarm is displayed and the motor 2 is decelerated and stopped.

Execution of the above operation not only can positively detect the excessive imbalance due to omission of storage of the bottle into the rotor 1, but also can operate the centrifuge with no wrong detection of the sample imbalance even in a state where, when the rotor 1 with the balanced samples stored therein is mounted onto the drive shaft 3, the rotor 1 is oscillated in error.

According to the present embodiment, the swinging motion of the drive shaft 3 is detected using the displacement sensor 5. However, alternatively, the imbalance can be detected similarly by detecting the swinging motion of the rotor 1.

What is claimed is:
1. A centrifuge comprising:
a rotor for separating samples;
a motor for driving and rotating the rotor;
a drive shaft for connecting together the motor and the rotor;
a rotation sensor for detecting at least one of the rotation speed of the motor and the rotor;

a displacement sensor for detecting a swinging amount of the rotor or the drive shaft; and a control unit for controlling a rotational speed of the motor, wherein the control unit comprises:

first means for judging, after at least one of speed of the motor and the rotor is accelerated up to a previously set rotation speed, whether the swinging amount is more than a preset allowable value or not;

second means for stopping the supply of power to the motor to decelerate the motor when the swinging amount is more than the preset allowable value;

third means for accelerating the motor when the swinging amount is equal to or less than the preset allowable value;

fourth means for repeatedly judging whether the swinging amount is more than the preset allowable value or not after decelerating or accelerating the motor; and fifth means for controlling the rotation of the motor based on the result of judging by the fourth means.

2. A centrifuge according to claim 1, wherein, during the deceleration, a signal from the displacement sensor is compared with the preset allowable value at a given interval by the control unit.

3. A centrifuge according to claim 2, wherein the given interval is given time interval.

4. A centrifuge according to claim 2, wherein the given interval is the deceleration speed of the motor or rotor.

5. A centrifuge according to claim 1, wherein the fifth means stops the rotation of the motor when the swinging amount becomes more than the preset allowable value for a predetermined time as a result of judging by the fourth means.

* * * * *